US006185684B1

(12) United States Patent
Pravetz et al.

(10) Patent No.: US 6,185,684 B1
(45) Date of Patent: Feb. 6, 2001

(54) SECURED DOCUMENT ACCESS CONTROL USING RECIPIENT LISTS

(75) Inventors: James D. Pravetz, Sunnyvale; Thomas J. Malloy, Portola Valley, both of CA (US)

(73) Assignee: Adobe Systems, Inc., San Jose, CA (US)

(*) Notice: Under 35 U.S.C. 154(b), the term of this patent shall be extended for 0 days.

(21) Appl. No.: 09/143,286

(22) Filed: Aug. 28, 1998

(51) Int. Cl.[7] .................................................... G06F 11/30
(52) U.S. Cl. ...................... 713/182; 713/168; 713/169; 713/180; 380/28; 380/255; 380/258
(58) Field of Search ..................... 713/161, 167, 713/168, 169, 180, 182; 380/255, 258, 28

(56) References Cited

U.S. PATENT DOCUMENTS

| 4,268,911 | * | 5/1981 | Bell | 365/104 |
|---|---|---|---|---|
| 4,453,074 | * | 6/1984 | Weinstein | 380/23 |
| 4,613,937 | * | 9/1986 | Batty, Jr. | 607/31 |
| 4,650,975 | * | 3/1987 | Kitchener | 235/375 |

OTHER PUBLICATIONS

RSA Data Security, Inc. Public–Key Cryptography Standards (PKCS) "PKCS#7: Cryptographic Message Syntax Standard".

* cited by examiner

Primary Examiner—Thomas R. Peeso
(74) Attorney, Agent, or Firm—Blakely, Sokoloff, Taylor & Zafman

(57) ABSTRACT

A method for providing secured access to a document includes the steps of embedding a permissions attribute into a recipient list. The permissions attribute identifies permissions allowing various levels of access to a predetermined document. Each recipient listed in the recipient list has a corresponding permission associated therewith. Further, the method renders the recipient list and its contents tamper-proof.

44 Claims, 11 Drawing Sheets

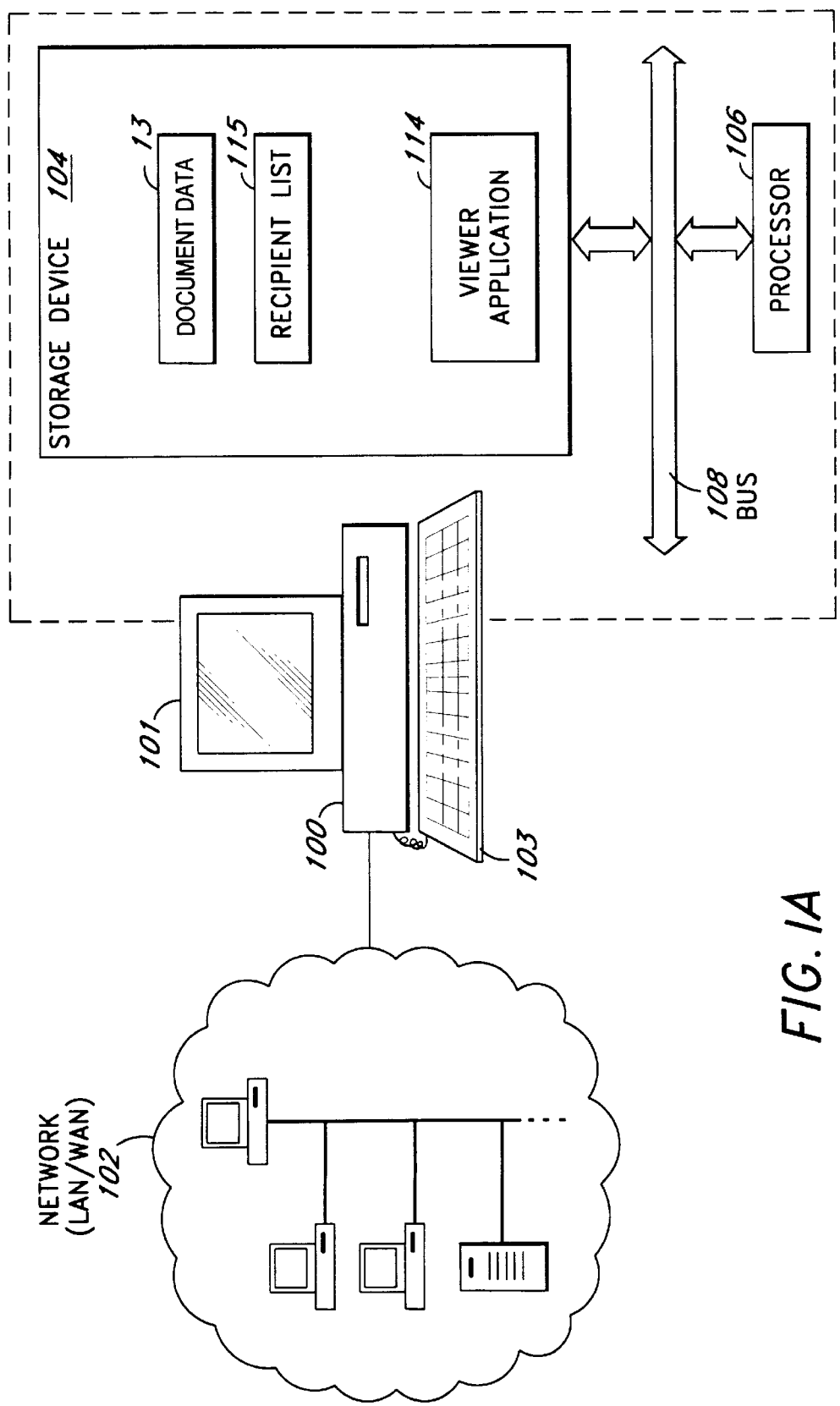

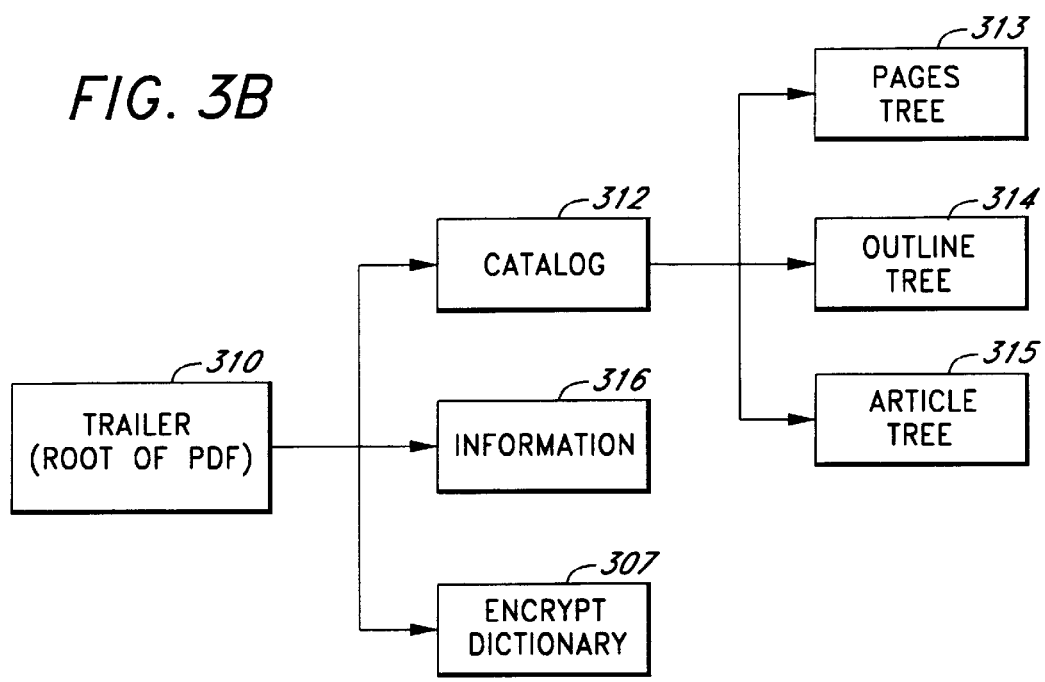
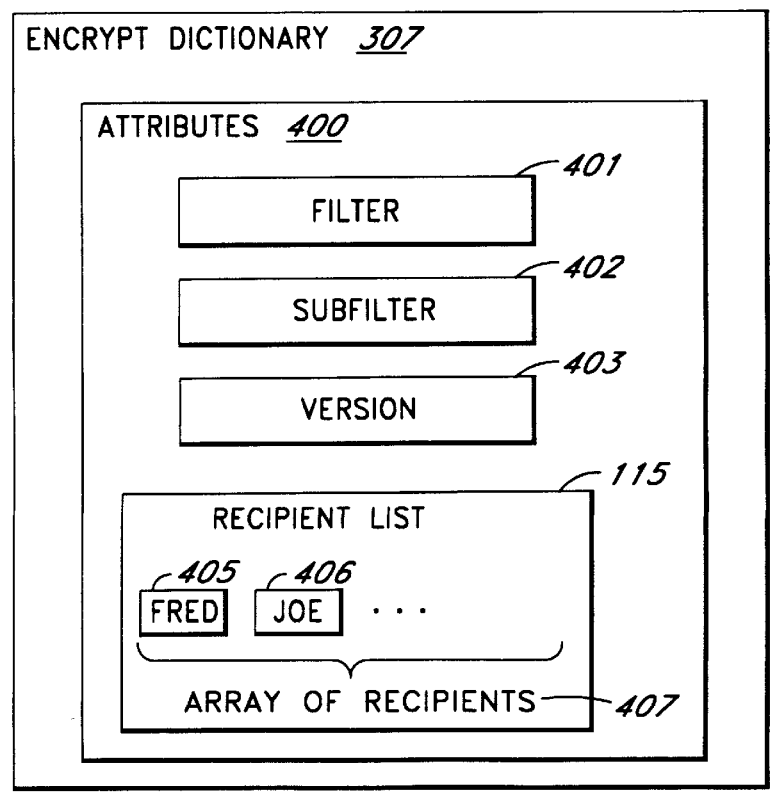

SECURED DOCUMENT ACCESS CONTROL USING RECIPIENT LISTS

BACKGROUND OF THE INVENTION (1) Field of the Invention

The present invention is related to the field of recipient lists for encrypted documents, more specifically, the method and apparatus of the present invention is related to embedding permission attributes into a recipient list listing recipients of encrypted documents.

(2) Related Art

Secured access to data including documents may be provided through use of passwords. For example, the document format referred to as the Portable Document Format (PDF) provides a mechanism whereby secure access to the data in a PDF file can be controlled through the use of passwords. This mechanism provides for two general categories of document recipients. One is an owner and the other is a user. An owner typically has one password and the user has another password. Thus, there are only two passwords associated with an encrypted document. When issued, the owner's password enables a user to gain full access and control of a document. The user password, when issued, enables the user to gain limited access to the document as defined by the owner.

There are several disadvantages to existing methods of providing secure access to a document. For example, in order for a recipient to gain access to a document, the user (or owner) password must be made available and all recipients must use the same user (or owner) password. Additionally, currently available methods only provide two levels of access, namely an owner and a user level of access. However, different identified users may need to be privileged with different levels of access to a document.

It is therefore desirable to associate permissions to recipients of a document providing them variable levels of access to the document and use of a dedicated access key providing access to the document.

BRIEF SUMMARY OF THE INVENTION

A method for providing secured access to a document embeds a permissions attribute into a recipient list. The permissions attribute identifies permissions allowing various levels of access to a predetermined document. Each recipient listed in the recipient list has a corresponding permission associated therewith. Further, the method renders the recipient list and its contents tamper-proof.

In one embodiment of the present invention, the document to be accessed is a portable document format (PDF) document residing in a PDF file. In this embodiment, the method encapsulates the recipient list into the PDF file. A PDF viewer application controls the enforcement of the permissions on each recipient listed in the recipient list in response to the recipient attempting to access the predetermined document. In the more general case, the invention may be applied to arbitrary data.

BRIEF DESCRIPTION OF THE DRAWINGS

FIG. 1a illustrates a computer system with the method and apparatus of the present invention.

FIG. 3b illustrates an embodiment of a PDF file object organization having an encrypt dictionary with the present invention's permissions attribute.

FIG. 4 illustrates an embodiment of an exemplary encrypt dictionary object of the present invention.

DETAILED DESCRIPTION OF THE INVENTION

Figure 1B:
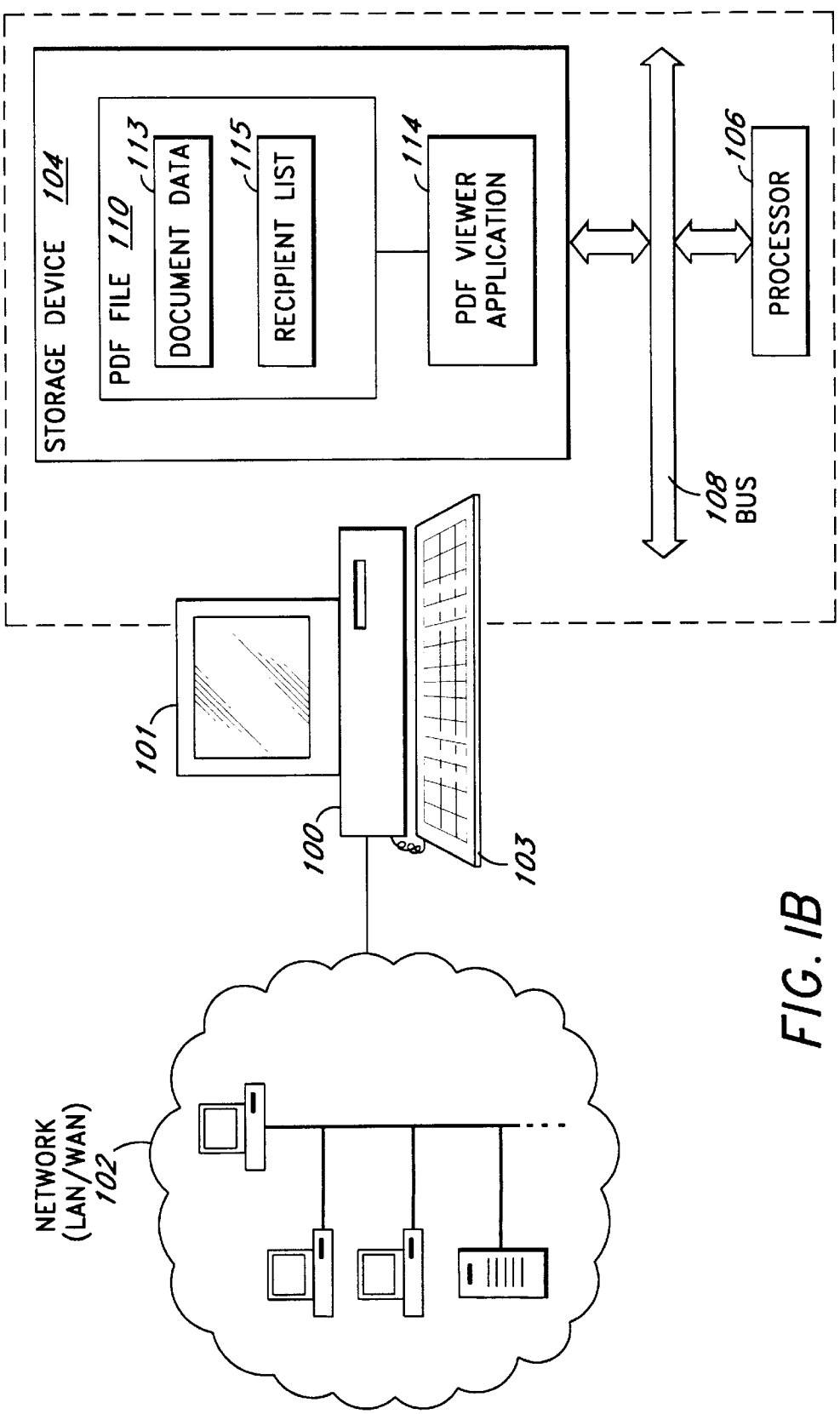
FIG. 1b illustrates a computer system with a preferred embodiment of the method and apparatus of the present invention.

The present invention is a method and apparatus for embedding permissions into a recipient list to provide variable levels of access to a document. For each document recipient, the recipient's public cryptographic key is utilized to encrypt information that contains the document key and access permissions that are granted to the recipient. With the use of the recipients private cryptographic key a viewer application is able to decrypt the recipient's access key and document access permissions.

The viewer application additionally executes a tamper-proofing message digest algorithm over the contents of the recipient list, which includes the encrypted access keys and permissions. The combination of this message digest and the recipient's access key is used to generate the document access key. The viewer application then utilizes this document access key to decrypt the document, and utilizes the recipient's document access permissions information to determine the level of access that the recipient has to the document.

FIG. 1a illustrates an embodiment of a computer system with the method and apparatus of the present invention. A computer 100 has a display device, such as a monitor 101 and an input device, such as a keyboard 103. In one embodiment, the computer 100 may be coupled to a network 102 such as a local area network (LAN) or a wide area network (WAN). The network 102 is a possible mechanism for distribution of secure documents.

Computer 100 has a storage device 104 coupled to a processor 106 by a bus or busses 108. The storage device 104 has a document 13 and a recipient list 115. The recipient list 115 contains a list of recipients allowed access to the document 13. In one embodiment, the recipient list 115 is associated with the document 13 and is contained within the document 13.

The document 13 may be viewed through a viewer application 114 providing a graphical user interface (GUI). In an alternate embodiment, the document 13 may be any type of electronic data which requires secured access.

The invention embeds permission attributes into the recipient list 115. The permission attributes identify varying levels of access to the document 13 as provided to each recipient listed in the recipient list 115. The viewer application 114 accesses the permission attributes embedded in the recipient list 115 to determine the level of access permission of a given recipient to a given document 13. The permissions are programmatically enforced by the viewer application.

FIG. 1b illustrates a computer system with a preferred embodiment of the method and apparatus of the present invention. In this preferred embodiment of the invention, the document 113 is a portable document format (PDF). In this embodiment, the storage device 104 has a PDF file 110 that encapsulates a recipient list 115.

PDF is a file format utilized to represent a document in a manner independent of the application software, hardware and operating system used to create it. Document data 113 in a PDF file 110 contains one or more pages, each page in the document containing a combination of text, graphics and images. Document data 113 may also contain information such as hypertext links, sound and movies. The recipient list 115 contains a list of recipients allowed access to the PDF file 110 document data 113.

The PDF file 110 may be browsed or viewed through a PDF viewer application 114 providing a graphical user interface (GUI). PDF viewer application 114 may be Adobe Acrobat Exchange™ or Acrobat Reader applications, both made available by Adobe Systems, Inc. of San Jose, Calif.

The present invention embeds permission attributes into the recipient list 115. The permission attributes identify varying levels of access to data contained in the PDF file 110 as provided to each recipient listed in the recipient list 115. The PDF viewer application 114 accesses the permission attributes embedded in the recipient list 115 to determine the level of access permission of a given recipient to a given PDF file 110. The permissions are programmatically enforced by the PDF viewer application 114.

The remainder of the detailed description will be described in reference to the preferred embodiment of the present invention illustrated in FIG. 1b. However, it can be appreciated by a person skilled in the art that other equally applicable embodiments may be derived given the detailed description provided herein.

Figure 2:
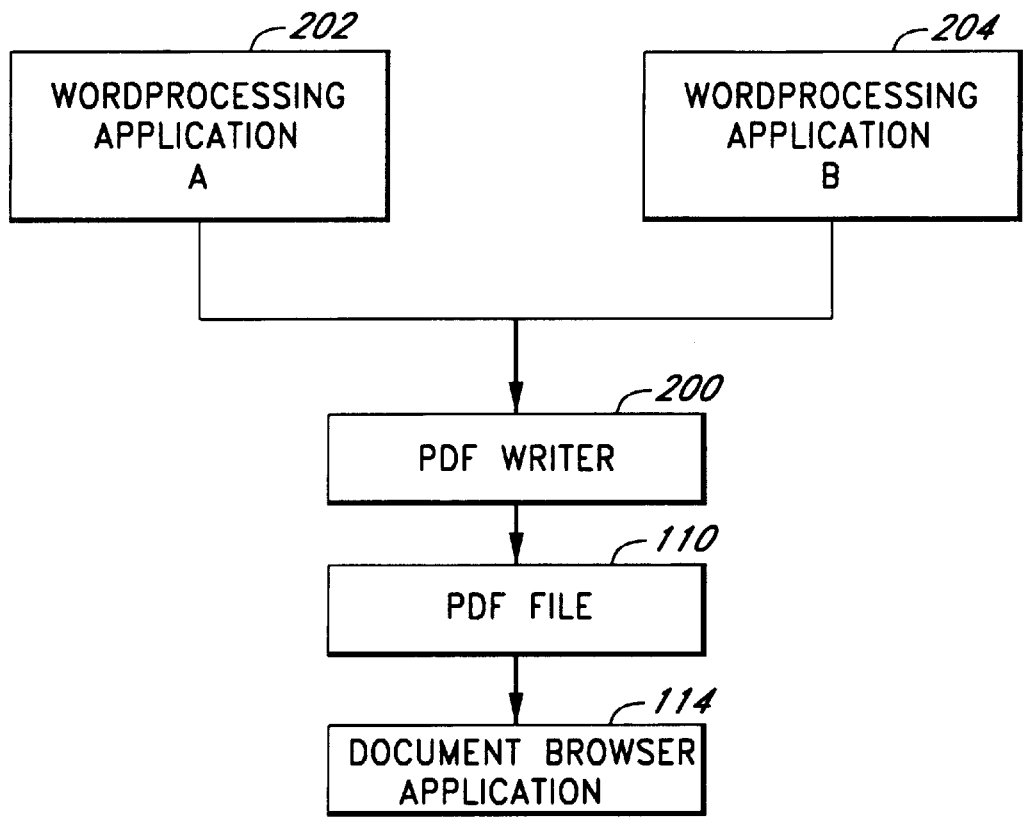
FIG. 2 is one embodiment illustrating the creation of a PDF file.

FIG. 2 is an exemplary embodiment illustrating the creation of a PDF file. A PDF writer application 200 available on both Apple® MacIntosh® and IBM®-compatible computers using the Microsoft Windows™ environment. The PDF writer application 200 converts operating system graphics and text commands generated by an application A 202 or application B 204 to PDF operators and embeds them in a PDF file as illustrated in FIG. 2. The PDF files generated are platform independent and may be viewed by a PDF viewer application on any supported platform.

Figure 3A:
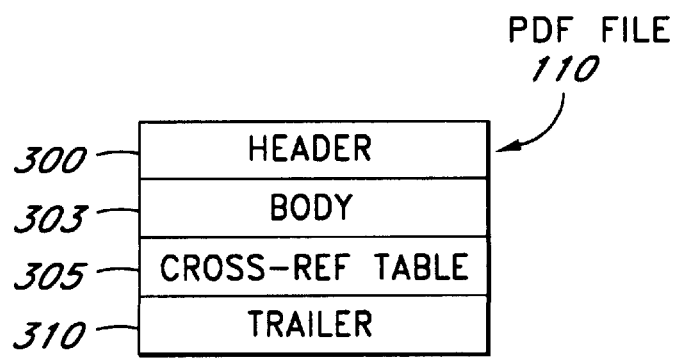
FIG. 3a illustrates an embodiment of the PDF file structure having an encrypt dictionary with the present invention's permissions attribute.

FIG. 3a illustrates an embodiment of the PDF file 110 file structure. A header 300 specifies the version number of the PDF specification to which the PDF file 110 adheres. A body 303 of a PDF file 110 consists of a sequence of indirect objects representing a document. The objects represent components of the PDF document, such as fonts, pages and sampled images. A cross-reference table 305 contains information which permits random access to indirect objects in the PDF file 110, such that the entire PDF file 110 need not be read to locate any particular object. Finally, a trailer 310 enables an application reading a PDF file 110 to quickly find the cross-reference table and to locate special objects.

In the preferred embodiment illustrated in FIG. 1b, the recipient list 115 with the present invention's permission attributes are encapsulated in one of the special objects directly referenced by the trailer 310.

FIG. 3b illustrates an embodiment of a PDF object organization having an encrypt dictionary with the permission attributes of the present invention. The body of the PDF file 110 consists of a sequence of objects that collectively represent a single data 113 in a PDF file 110. An exemplary PDF file 110, as illustrated in FIG. 3b has a trailer object 310 which specifies the locations of the catalog object 312, the information object 316 and encrypt dictionary object 307.

Object as referred herein connotes different representations of data. PDF supports seven basic types of objects, namely Boolean, numbers, strings, names, arrays, dictionaries and streams. Catalog object 312, the information object 316 and the encrypt dictionary object 307 are all object of type dictionaries.

A dictionary object is an associative table containing pairs of objects. The first element of each pair is referred to as a key and the second element of each pair is referred to as a value. A key is a name or object identifier. A value can be any kind of object, including another dictionary. A dictionary is generally utilized to collect and tie together attributes of a complex object with each key value pair specifying the name and value of an attribute.

The catalog object 312 references a pages object 313, an outline object 314 and an article object 315. The pages object 313 provides the various pages in the data 113 in a PDF file 110. The outline object 314 specifies a linked list of objects that are table of contents entries that can be used to quickly navigate to sections of a document. The article object 315 specifies a linked list of objects that are used to provide a navigation method for following threads of articles in a document.

The information dictionary object 316 is a structure which contains general information about the data 113 in a PDF file 110, including title and author of the document and the last modified date of the document.

Finally, the encrypt dictionary object 307 specifies the security handler to be used to authorize access to a given data 113 in a PDF file 110. There can be any number of security handlers available to control access to a PDF file 110. The invention pertains to a particular security handler design.

The present invention's recipient list 115 with embedded permission attributes is encapsulated in the encrypt dictionary object 307 of the PDF file 110.

FIG. 4 illustrates an embodiment of an exemplary encrypt dictionary object with the permission attributes of the present invention. The encrypt dictionary object 307 contains various attributes 400. The filter attribute 401 indicates the security handler that is to be used to process the encrypt dictionary 307 contents. The sub-filter attribute 402 indicates the standardized syntax or format of the encrypt dictionary 307 contents. The version attribute 403 specifies the version of the security handler that is being used.

In one embodiment, a recipient list attribute 115 is an array of recipients 407, for example, an array of recipients Fred Smith 405 and Joe Allen 406. Each recipient listed in the recipient list 115 has an associated permission attribute associated therewith and residing in the recipient list 115.

Figure 5:
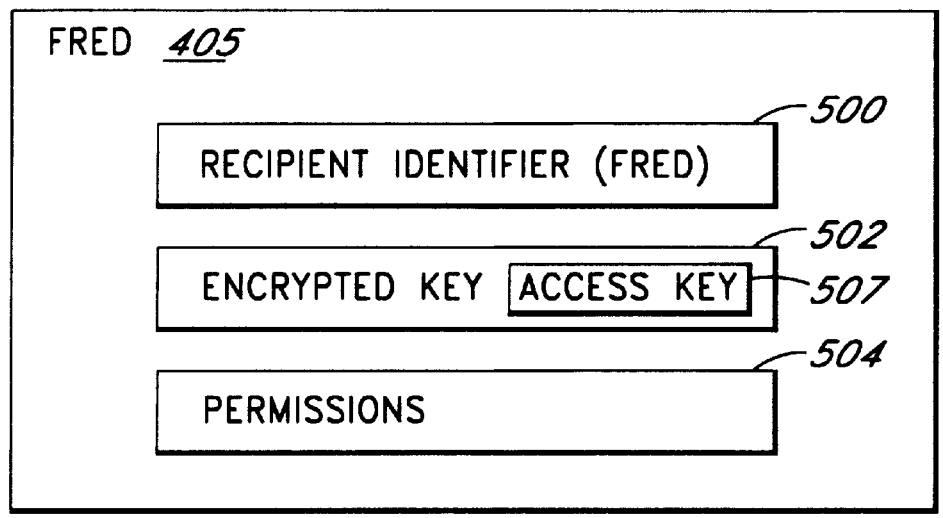
FIG. 5 illustrates an exemplary recipient object.

FIG. 5 illustrates an exemplary recipient object residing in an encrypt dictionary of a PDF file. Recipient object Fred Smith 405 has a recipient identifier attribute 500 identifying the recipient as Fred Smith, an encrypted key 502 containing an encrypted form of an access key 507 providing access to the PDF file data 113. The access key 507 is encrypted once for every recipient in the recipient list 115 using the public key of the corresponding recipient. The recipient object Fred Smith 405 also has a permissions attribute 504 identifying the level of permission provided to the recipient to access the data 113 in a PDF file 110. In one embodiment, the permissions attribute 504 may be optionally encrypted using the public key of the recipient.

Figure 6:
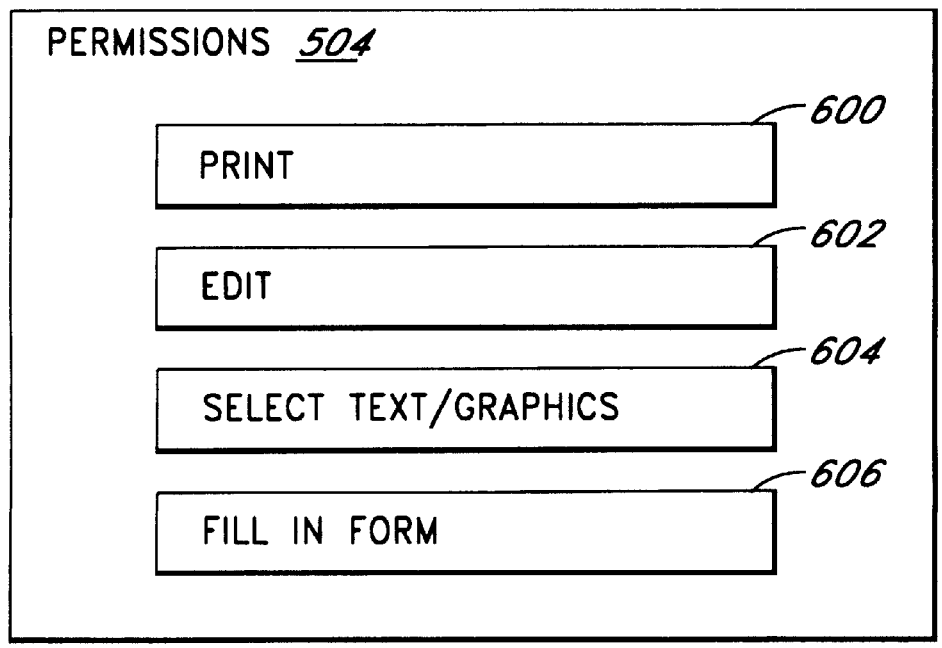
FIG. 6 illustrates exemplary permissions attributes of the present invention.

FIG. 6 illustrates exemplary permissions associated with a permissions attribute. A permissions attribute 504 may indicate varying levels of permissions allowing access to data 113 in a PDF file 110, including permission to print 600 the data 113, permission to edit 602 the PDF document, permission to select text or graphics 604 to copy the text or graphics in data 113 in a PDF file 110 to a different document and permission to fill in forms 606.

A given permissions attribute 504 may have one or more of the permissions described above providing varying levels of permission to access a given data 113 in a PDF file 110. Although there are only four permissions described above, a person skilled in the art may appreciate that there may be numerous other permissions associated with a permissions attribute 504 given the detailed description of the present invention provided herein.

Figure 7:
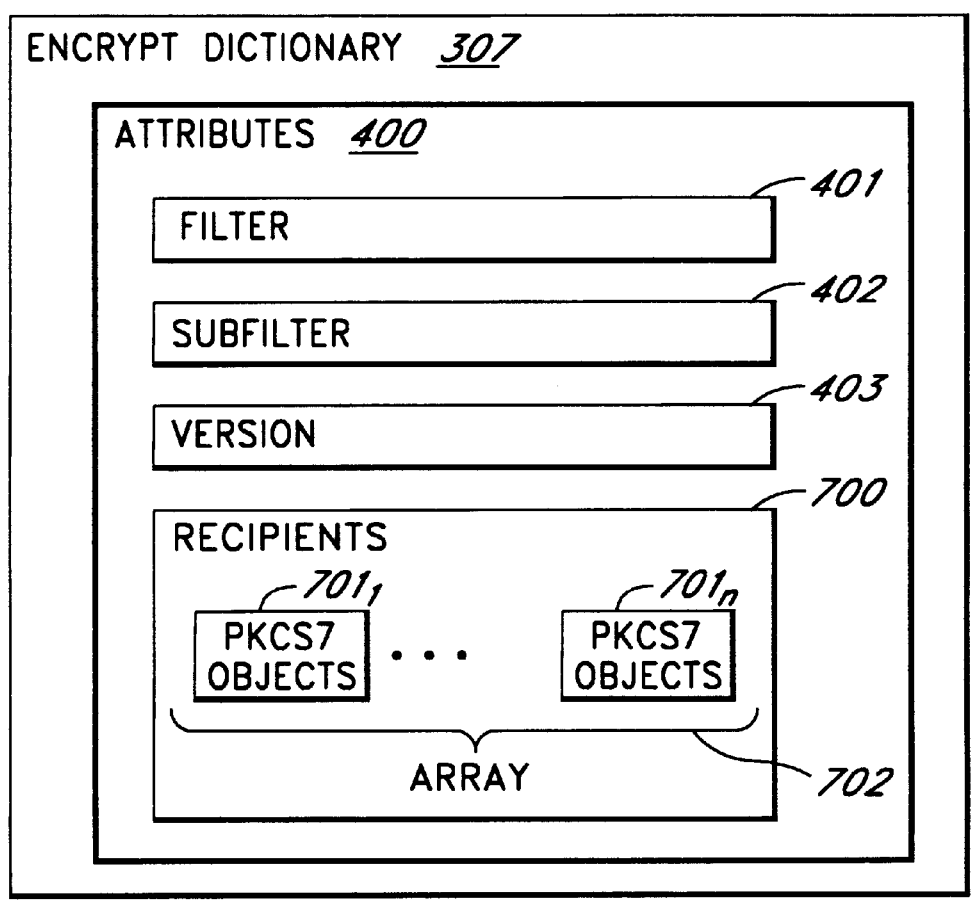
FIG. 7 illustrates an alternate embodiment of an encrypt dictionary with the present invention's permissions attribute.

FIG. 7 illustrates an alternate embodiment of the encrypt dictionary of the present invention. In an alternate embodiment, an encrypt dictionary 307 has attributes 400. Attributes 400 has a filter 401, sub-filter 402, version 403 and in this embodiment, has a recipients attribute 700 that contains an array 702 of Public Key Cryptographic Standard number 7 (PKCS#7) objects $701_1 \ldots 701_N$.

PKCS#7 is a Public Key Cryptographic Standard from RSA Data Securities, Inc. of San Mateo, Calif. PKCS#7 is an object specification where the object is binary encoded and contains various attributes. When used to encrypt data, a PKCS#7 object is designed to encapsulate a single encrypted copy of the data to be encrypted. This encapsulated, encrypted data is referred to as the enveloped-data. The PKCS#7 object also contains a list of recipients for the data and for each recipient, an encrypted key that can be used to decrypt the encrypted data. The encrypted key is encrypted using the recipient's public key.

An exemplary encrypt dictionary 307 implementation of the present invention is as follows:

<</Filter Adobe.PPKEF
/Subfilter /adobe.pkcs7.s3
/V 1
/Recipients [( . . . binary data containing PKCS#7 object for recipients with like document access permissions . . . ) . . . ( . . . binary data containing PKCS#7 object for recipients with like document access permissions . . . )]>>

In this embodiment, recipients with identical document access permissions are grouped together into the same PKCS#7 object. These PKCS#7 objects are ordered into an array of PKCS#7 objects $701_1 \ldots 701_N$. The permissions attribute is encapsulated into each PKCS#7 object 701. The first PKCS#7 object 701 may, for example, contain all recipients that have 'owner' or full access permissions (e.g. print, edit, select text/graphics, fill in forms) to data 113 in a PDF file 110. Subsequent entries in the array 702 will have more restricted access permissions.

Figure 8:
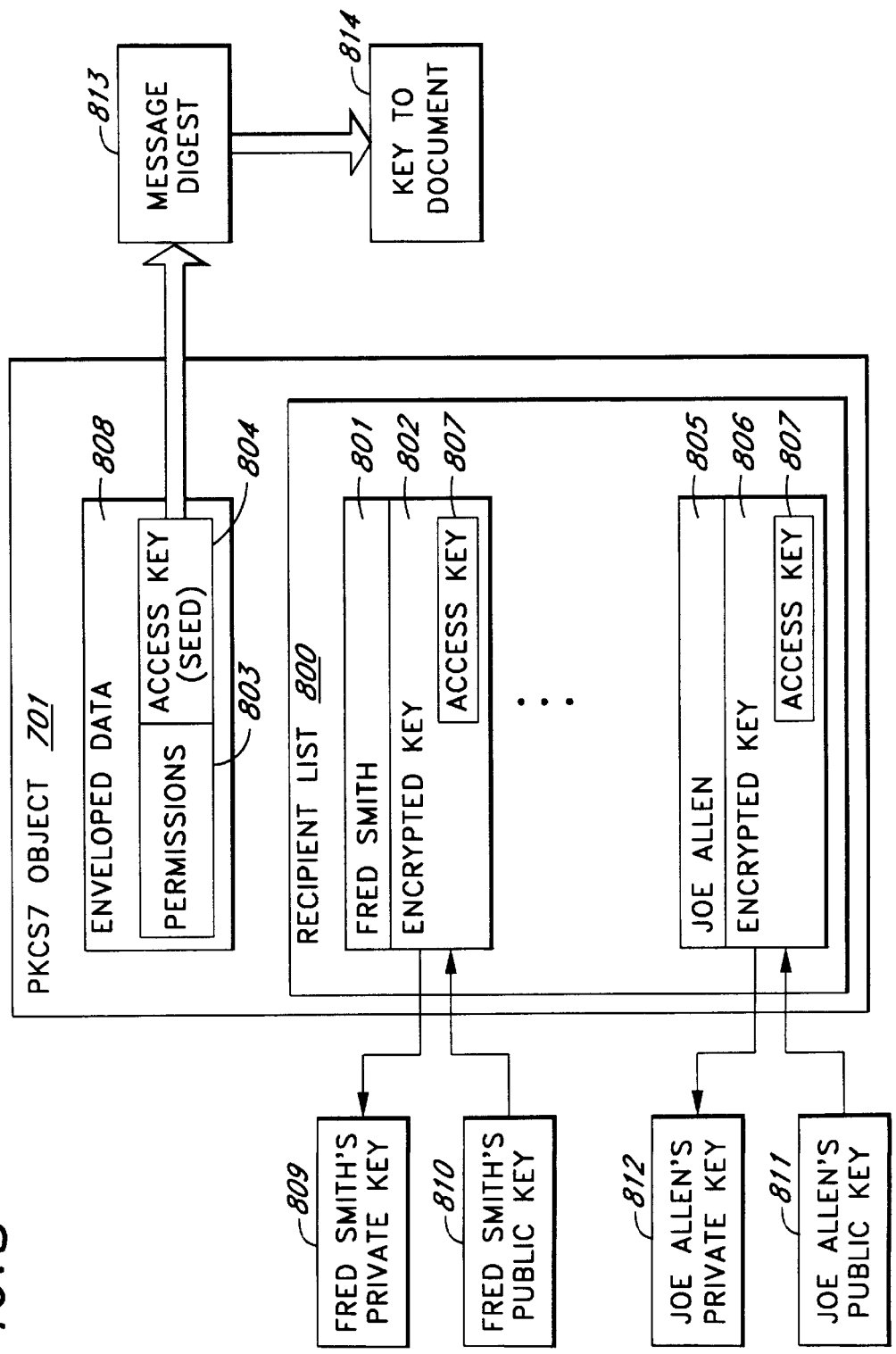
FIG. 8 illustrates one embodiment of a PKCS#7 with the present invention's permission attribute.

FIG. 8 illustrates one embodiment of a PKCS#7 object with the present invention's permissions attribute. The exemplary PKCS#7 object is illustrated with a recipient list 800 which contains a list of recipients, along with a corresponding encrypted access key to be used to access data 113 in a PDF file 110 and enveloped data 808 containing the permissions attribute 803. In an alternate embodiment, the permissions attribute 803 is not encrypted.

More specifically, a recipient's private key is used to decrypt an access key 807. The access key 807 is the same for every recipient in the same PKCS#7 object. However, the access key 807 is encrypted once for every recipient in the recipient list using the individual public keys of each recipient.

For example, a recipient Fred Smith 801 has an encrypted key 802 which is the access key 807 encrypted using Fred Smith's public key 810. The access key 807 is the same for Fred Smith 801, Joe Allen 805 and every other recipient listed in PKCS#7 object 701. However, the access key 807 is encrypted once for each recipient listed in the recipient list using the public key of each recipient. Thus, Joe Allen 805's access key 807 is encrypted using Joe Allen 805's public key 811 to generate Joe Allen 805's encrypted key 806.

The encrypted key of each recipient may be decrypted using the recipient's own private key to generate the access key 807. For example, the encrypted key 802 of Fred Smith 801 may be decrypted using Fred Smith 801's private key 809 to generate the access key 807. Similarly, Joe Allen 805's encrypted key 806 may be decrypted using Joe Allen 805's own private key 812 to generate the access key 807.

The access key 807 is used to decrypt the single copy of the enveloped data 808 in the PKCS#7 object 701. The enveloped data 808 contains a new access key (seed) 804 along with permissions attribute 803 that describes the permissions granted to all recipients in the PKCS#7 object 701. The new access key (seed) 804 is the same in all PKCS#7 objects in the recipient array 702 of PKCS#7 objects $701_1 \ldots 701_N$.

The new access key (seed) 804 and the binary data of all PKCS#7 objects $701_1 \ldots 701_N$ in the recipient array 702 are fed to a message digest algorithm 813 to produce the actual access (document) key 814 that is used to decrypt data (data 113 in a PDF file 110) in the PDF file 110. Message digests are well known in the art and include, for example, Secure Hash Algorithm version one (SHA-1) by the National Institute of Standards and Technology (NIST) and described in the Federal Information Processing Standards (FIPS) published in 1994 or Message Digest 5 (MD5) by R. L. Rivest in 1991 which is described in detail in Internet Request For Comments (RFC) 1321 dated April 1992.

Once the actual access (document) key 814 is made available to the PDF viewer application 114, the PDF viewer application 114 utilizes the actual access (document) key 814 to access the data 113 in a PDF file 110 and provides the corresponding recipient access to the data 113 according to the recipient's permissions attribute 803.

Figure 9A:
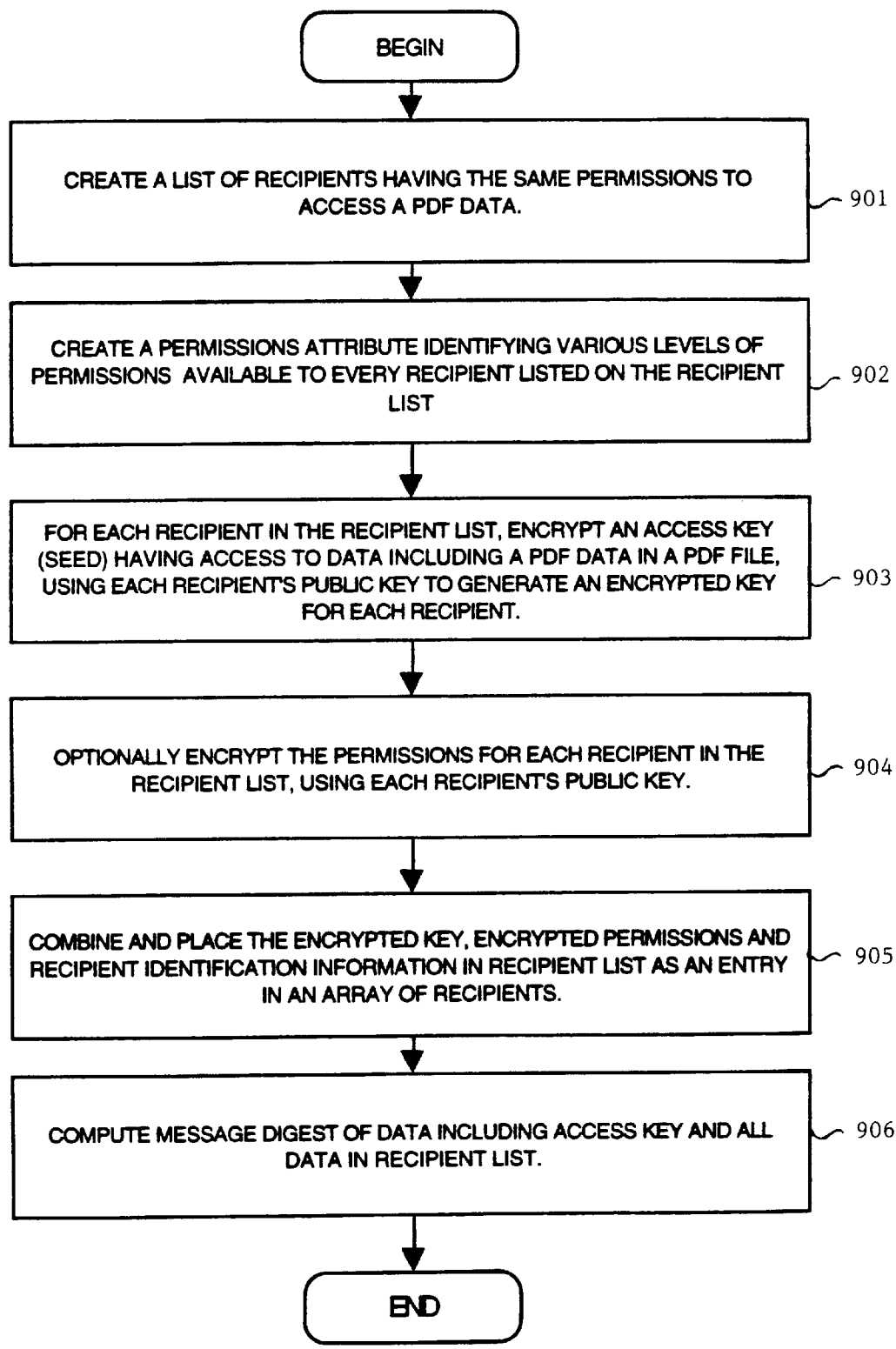
FIGS. 9a and 9b are flow diagrams illustrating the general steps followed by the present invention in embedding permission attributes in a recipient list and extracting the permissions.
Figure 9B:
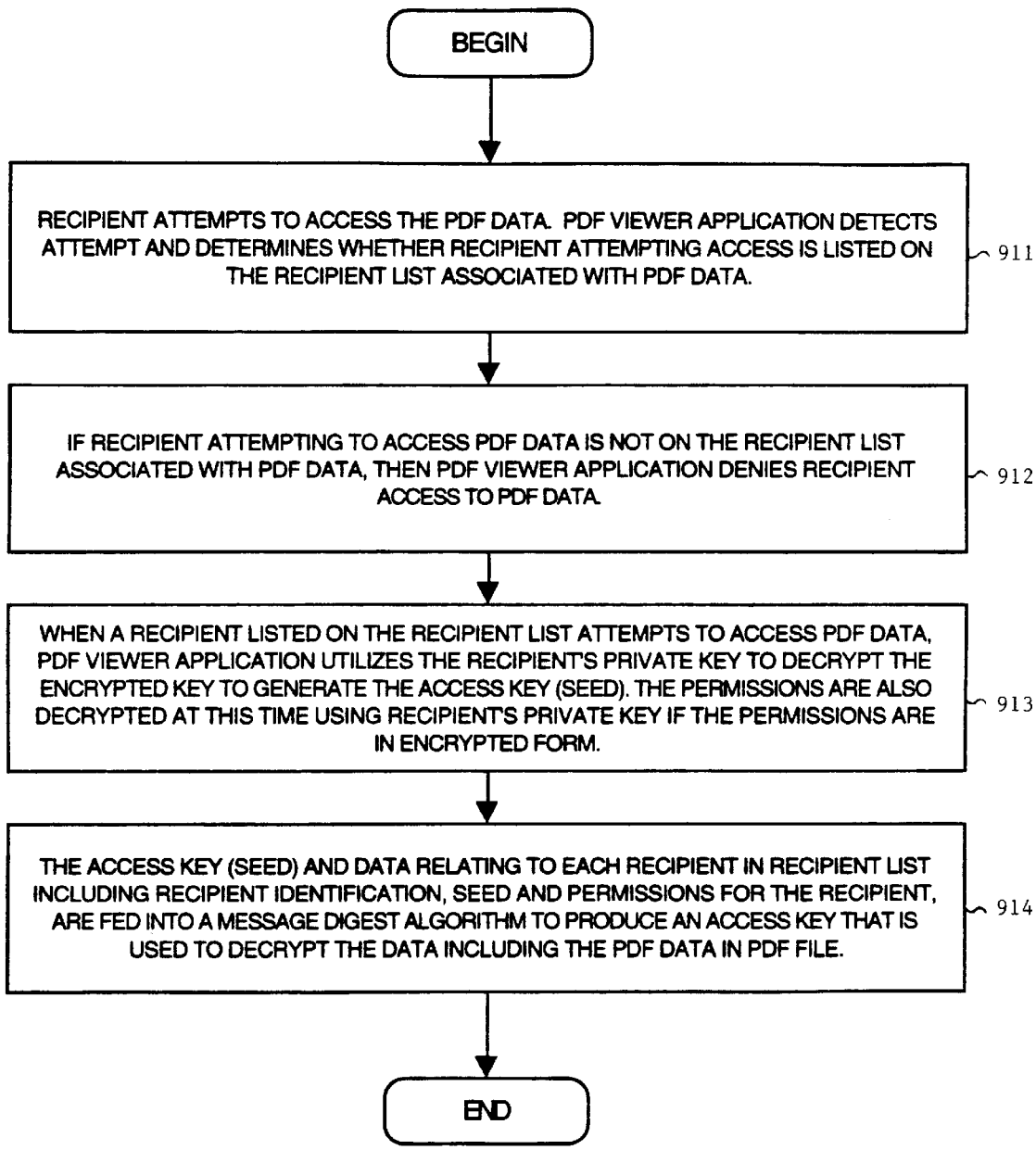

FIGS. 9a and 9b are flow diagrams illustrating the general steps followed by one embodiment of the present invention in embedding the permissions attribute in a recipient list and extracting the permissions attribute. The FIGS. 9a and 9b specifically corresponds to the embodiment illustrated in FIGS. 4 and 5.

FIG. 9a is a flow diagram illustrating the general steps followed by the present invention in embedding a permissions attribute in a recipient list. In step 901, create a list of recipients that can access the data 113 in a PDF file 110. In step 902, for each recipient list, a permissions attribute 504 identifying the various levels of permissions available to every recipient listed on the recipient list 115 is created.

In step 903, an access key (seed) 507 having access to data including data 113 in a PDF file 110 is encrypted for each recipient in the recipient list 115 using each recipient's public key to generate an encrypted key 502 for each recipient. In step 904, the permissions 504 may be optionally encrypted for each recipient in the recipient list 115 using each recipient's public key.

In step 905, the encrypted key 502, (encrypted) permissions 504, and identification 500 information are combined and placed in the recipient list 115 as an entry in an array of recipients 407.

In step 906, a message digest is computed of data that includes the access key 508 and all data in the recipient list 115. The result of this message digest is used to form the access key that is used to encrypt data 113 in the PDF file 110 and to tamper proof the data in the recipient list 115.

FIG. 9b is a flow diagram illustrating the general steps followed by the present invention in extracting the permissions attribute and an access key. In step 911, a recipient attempts to access the data 113 in a PDF file 110. The PDF viewer application 114 detects the attempt and determines whether the recipient attempting access is listed in a recipient list 115 associated with the data 113 in a PDF file 110.

In step 912, if the recipient attempting to access the data 113 is not in any recipient list 115 associated with the data 113, then the PDF viewer application 114 denies the recipient access to the data 113 in a PDF file 110. Otherwise, in step 913, when a recipient listed on the recipient list 115 attempts to access the data 113 in a PDF file 110, the PDF viewer application 114 utilizes the recipient's private key to decrypt the encrypted key 502 to generate the access key (seed) 507. At this time, the permissions 504 are also decrypted using the recipient's private key if the permissions 504 are in an encrypted form.

In step 914, the access key (seed) 507 and the data relating to each recipient in the recipient list 115 including the recipient identification and the permissions for the recipient are fed into a message digest algorithm to produce an access key that is used to decrypt the data including the data 113 in the PDF file 110.

Figure 10A:
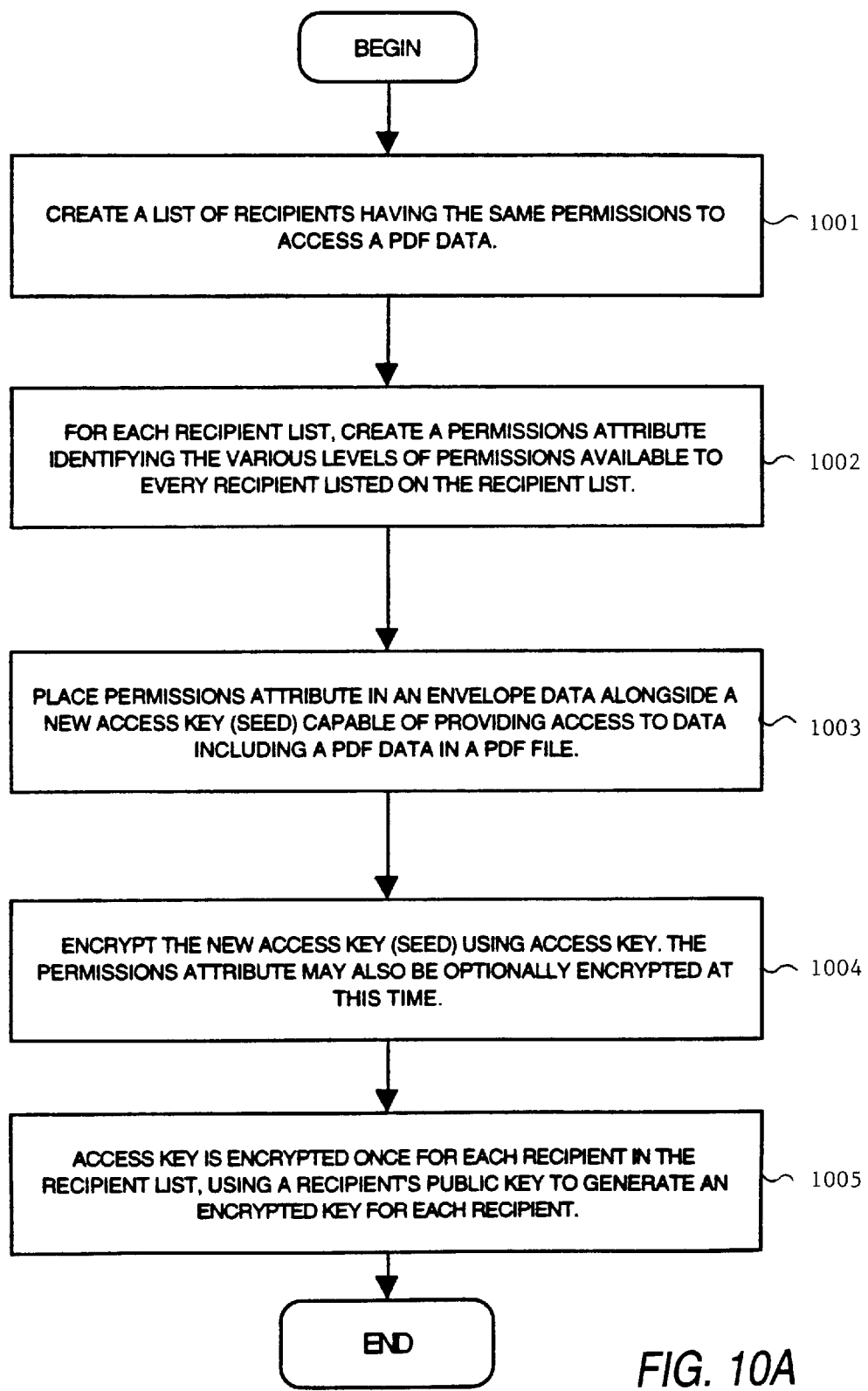
FIGS. 10a and 10b are flow diagrams illustrating the general steps followed by an alternate embodiment of the present invention in embedding permission attributes in a recipient list and extracting the permissions.
Figure 10B:
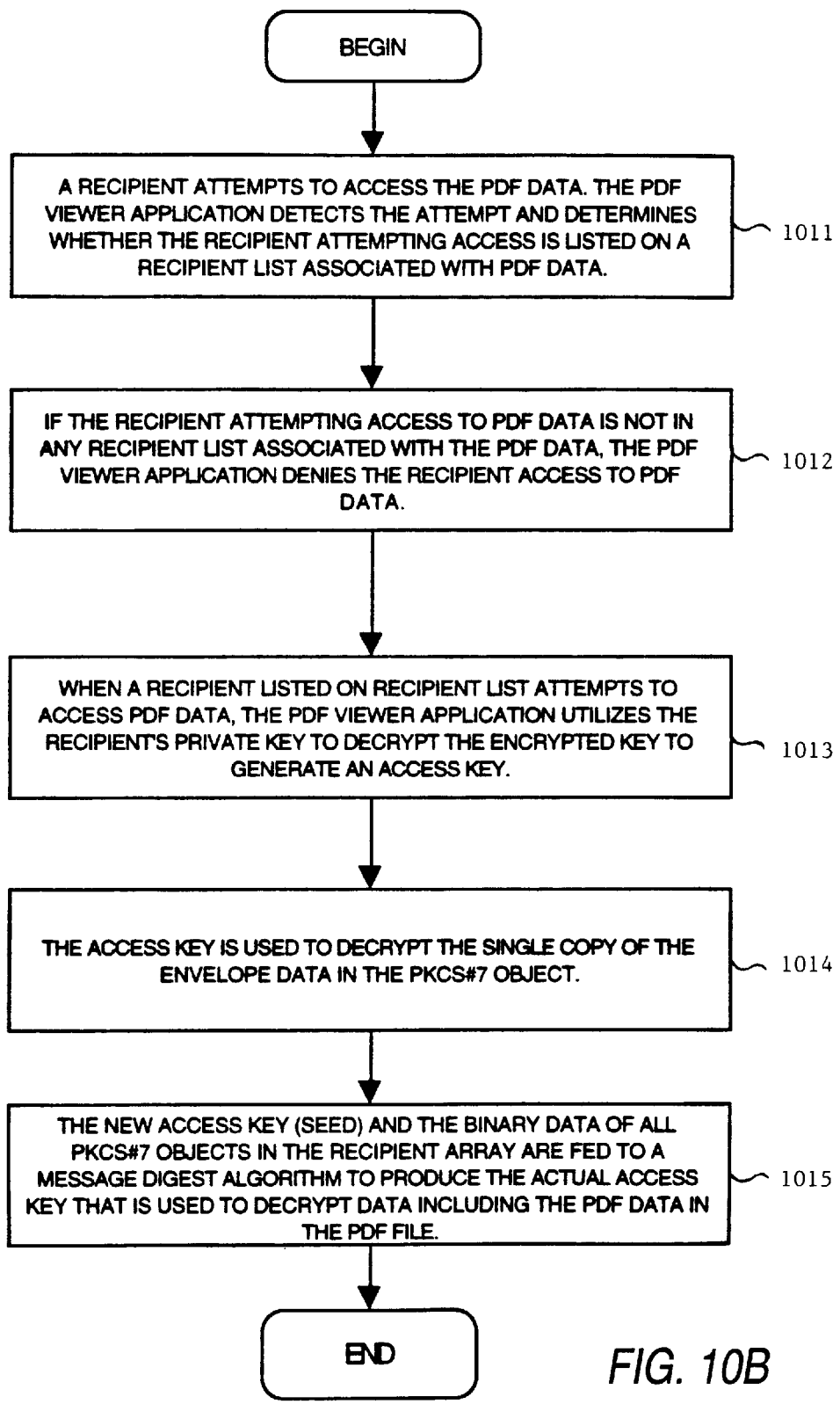

FIGS. 10a and 10b is a flow diagram illustrating an alternate embodiment of the general steps followed by the present invention in embedding permission attributes in a recipient list and extracting the permissions and the access key. In this embodiment, the recipient list is encapsulated in a PKCS#7 object and refers specifically to the embodiment illustrated in FIGS. 7 and 8.

FIG. 10a is a flow diagram illustrating the general steps followed by the alternate embodiment of the present invention in embedding permissions attributes in a recipient list. In step 1001, a list of recipients 800 having the same permissions to access data 113 in a PDF file 110 is created. In step 1002, for each recipient list, a permissions attribute identifying the various levels of permissions available to every recipient listed on the recipient list 800 is created.

In step 1003, the permissions attribute 803 is placed along side the access key (seed) 804 capable of providing access to data including data 113 in a PDF file 110. In step 1004, the data referenced in step 1003 (permissions attribute 803 along side the access key (seed) 804) is encrypted using an access key 807, then, placed in the PKCS#7 object 701 as the enveloped-data 808.

The access key 807 is the same for every recipient in the same PKCS#7 object, however, in step 1005, the access key 807 is encrypted once using the public key of each recipient in the recipient list 800 and stored in its encrypted form 806 along side the recipient identifier 805.

A message digest is computed in step 1006 over data that includes the access key 804 and all PKCS#7 objects 701 in the array of recipients 700. The result of this message digest is used to form the access key that is used to encrypt data 113 in the PDF file 110. Step 1006 is used to tamper proof the data in the recipient list 700.

FIG. 10b is a flow diagram illustrating the general steps followed by the alternate embodiment of the present invention in extracting the permissions and the access key to the document. In step 1011, a recipient attempts to access the data 113 in a PDF file 110. The PDF viewer application 114 detects the attempt and determines whether the recipient attempting access is listed in one of the recipient lists contained in the PKCS#7 object 701 in the array of recipients 700 associated with the PDF file 110.

In step 1012, if the recipient attempting to access the data 113 is not in any one of the recipient lists 800 in the array of recipients 700 associated with the PDF file 110, then the PDF viewer application 114 denies the recipient access to the data 113. Otherwise, in step 1013, when a recipient listed on the recipient list 800 attempts to access the data 113 in a PDF file 110, the PDF viewer application 114 utilizes the recipient's private key 810 to decrypt the encrypted key 802 to generate an access key 807. Each recipient in a recipient list of the same PKCS#7 object has associated therewith the same access key 807. The access key 807 is encrypted once for every recipient in the recipient list 800 using the public key of each recipient.

In step 1014, the access key 807 is used to decrypt the single copy of the enveloped data 808 in the PKCS#7 object 701. The enveloped data 808 contains a new access key (seed) 804 and the permissions attribute 803 that describes the permissions granted to all recipients in the PKCS#7 object 701. The access key 807 is the same in all PKCS#7 objects in the recipient array 702.

In step 1015, the new access key (seed) 804 and the binary data of all PKCS#7 objects in the recipient array 702 are fed to a message digest algorithm 813 to produce the actual access key 814 that is used to decrypt data including the data 113 in the PDF file 110.

What has been described is a method and apparatus for embedding permissions attributes in a recipient list to provide varying levels of access to data in a PDF file.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for providing secured access to a document comprising:

embedding a plurality of permissions attribute into a recipient list listing intended recipients of a predetermined data, said plurality of permissions attribute identifying permissions to access said predetermined data, each said recipient in said recipient list having at least one of said plurality of permissions attribute being associated therewith;

enforcing said permission on each recipient listed on said recipient list in response to said recipient attempting to access said predetermined document, said enforcing being controlled by a viewer application.

2. The method of claim 1 wherein said predetermined document is a portable document format (PDF) document residing in a PDF file.

3. The method of claim 2 further comprising encapsulating said recipient list into said PDF file.

4. The method of claim 3 wherein said viewer application is a PDF viewer application.

5. The method of claim 1 comprising creating a list of recipients intended to receive said predetermined document.

6. The method of claim 5 comprising associating said permissions attribute with said recipient.

7. The method of claim 5 comprising encrypting an access key with a public key of said recipient, said access key configured to provide controlled access to said predetermined document.

8. The method of claim 7 comprising encrypting said permissions attribute with said public key of said recipient.

9. The method of claim 7 comprising performing a message digest operation on said access key and said permissions attribute to generate a document key having access to said predetermined document.

10. An apparatus for providing secured access to a document comprising:
   a permissions attribute identifying varying levels of permission to access a predetermined document; and
   a recipient list listing intended recipients of said predetermined document and having said permissions attribute associated therewith.

11. The apparatus of claim 10 wherein said predetermined document is a portable document format (PDF) document residing in a PDF file.

12. The apparatus of claim 10 wherein said recipient list comprises an array of recipients.

13. The apparatus of claim 12 wherein said array of recipients comprises a plurality of recipient entries.

14. The apparatus of claim 13 wherein each said plurality of entries comprises a recipient identifier identifying a corresponding recipient.

15. The apparatus of claim 13 wherein each said plurality of entries comprises an encrypted key, said encrypted key being the encrypted form of an access key configured to provide controlled access to said predetermined document.

16. The apparatus of claim 13 wherein each said plurality of entries comprises said permissions attribute.

17. The apparatus of claim 10 further comprising an array of PKCS#7 objects.

18. The apparatus of claim 17 wherein said array of PKCS#7 objects comprises a plurality of PKCS#7 objects.

19. The apparatus of claim 17 wherein each said PKCS#7 objects comprises said recipient list.

20. The apparatus of claim 19 wherein said recipient list comprises an encrypted key for each recipient listed in said recipient list, said encrypted key being an encrypted form of an access key, said encrypted key encrypted for each recipient in said recipient list using a public key of each recipient and capable of being decrypted using a private key of a corresponding said each recipient.

21. The apparatus of claim 20 wherein said recipient list comprises an encrypted seed data coupled to said permissions attribute, said encrypted seed data being the encrypted form of a seed data configured to provide controlled access to said predetermined data, each said PKCS#7 object associated with the same said predetermined document having the same said seed data, said encrypted seed data encrypted using said access key.

22. The apparatus of claim 21 wherein said permissions attribute is encrypted using said access key, said permissions attribute configured to be extracted from a corresponding said PKCS#7 object using said access key.

23. A system for providing secured access to a document stored in a computer-readable medium and executable by a computer, comprising:
   a permissions attribute configured to identify varying levels of permission to access a predetermined document; and
   a recipient list configured to list intended recipients of said predetermined document and having said permissions attribute associated therewith.

24. The system of claim 23 wherein said predetermined document is a portable document format (PDF) document residing in a PDF file.

25. The system of claim 23 wherein said recipient list comprises an array of recipients.

26. The system of claim 25 wherein said array of recipients comprising a plurality of recipient entries.

27. The system of claim 26 wherein each said plurality of entries comprises a recipient identifier identifying a corresponding recipient.

28. The system of claim 27 wherein each said plurality of entries comprises an encrypted key, said encrypted key being the encrypted form of an access key configured to provide controlled access to said predetermined document.

29. The system of claim 28 wherein each said plurality of entries comprises said permissions attribute.

30. The system of claim 29 further comprising an array of PKCS#7 objects.

31. The system of claim 30 wherein said array of PKCS#7 objects comprises a plurality of PKCS#7 objects.

32. The system of claim 31 wherein each said PKCS#7 objects comprises said recipient list.

33. The system of claim 32 wherein said recipient list comprises an encrypted key for each recipient listed in said recipient list, said encrypted key being an encrypted form of an access key, said encrypted key encrypted for each recipient in said recipient list using a public key of each recipient and capable of being decrypted using a private key of a corresponding said each recipient.

34. The system of claim 33 wherein said recipient list comprises an encrypted seed data coupled to said permissions attribute, said encrypted seed data being the encrypted form of a seed data configured to provide controlled access to said predetermined data, each said PKCS#7 object associated with the same said predetermined document having the same said seed data, said encrypted seed data encrypted using said access key.

35. The system of claim 34 wherein said permissions attribute is encrypted using said access key, said permissions attribute configured to be extracted from a corresponding said PKCS#7 object using said access key.

36. A computer readable media containing executable computer program instructions which when executed on a digital processing system causes the system to perform a method comprising:
   embedding a permissions attribute into a recipient list listing intended recipients of a predetermined document, said permissions attribute identifying permission to access said predetermined document;
   enforcing said permission on each recipient listed on said recipient list in response to said recipient attempting to access said predetermined document, said enforcing being controlled by a viewer application.

37. The computer readable media of claim 36 wherein said predetermined document is a portable document format (PDF) document residing in a PDF file.

38. The computer readable media of claim 37 further comprising encapsulating said recipient list into said PDF file.

39. The computer readable media of claim 38 wherein said viewer application is a PDF viewer application.

40. The computer readable media of claim 39 comprising creating a list of recipients intended to receive said predetermined document.

41. The computer readable media of claim 40 comprising associating said permissions attribute with said recipient.

42. The computer readable media of claim 41 comprising encrypting an access key with a public key of said recipient, said access key configured to provide controlled access to said predetermined document.

43. The computer readable media of claim 42 comprising encrypting said permissions attribute with said public key of said recipient.

44. The computer readable media of claim 43 comprising performing a message digest operation on said access key and said permissions attribute to generate a document key having access to said predetermined document.

\* \* \* \* \*